(No Model.)

J. HEBER.
COUPLING FOR LEAD PIPES.

No. 364,250. Patented June 7, 1887.

Witnesses:
M. E. Harrison
Jno. H. Roney

Inventor.
Jackson Heber
Per. O. D. Levis
att'y

UNITED STATES PATENT OFFICE.

JACKSON HEBER, OF BROOKVILLE, PENNSYLVANIA.

COUPLING FOR LEAD PIPES.

SPECIFICATION forming part of Letters Patent No. 364,250, dated June 7, 1887.

Application filed December 16, 1886. Serial No. 221,802. (No model.)

*To all whom it may concern:*

Be it known that I, JACKSON HEBER, a citizen of the United States, residing at Brookville, in the county of Jefferson, State of Pennsylvania, have invented certain new and useful Improvements in Pipe-Couplings for Lead Pipes; and I do hereby declare the following to be a full, clear, and exact description of the invention, such as will enable others skilled in the art to which it pertains to make and use the same, reference being had to the accompanying drawings, which form a part of this specification.

My invention relates to an improvement in the manner of attaching lead pipes together, the object being to provide a coupling whereby sections of lead pipe may be connected together in a simple and durable manner; and it consists in providing a short metallic section of pipe having a right and left hand thread formed on either end for attaching the same to the lead pipes, and a shoulder at the back of each thread, whereby the ends of the pipes may be clamped or crimped to further secure the same together, as will be fully described hereinafter.

Figure 1:
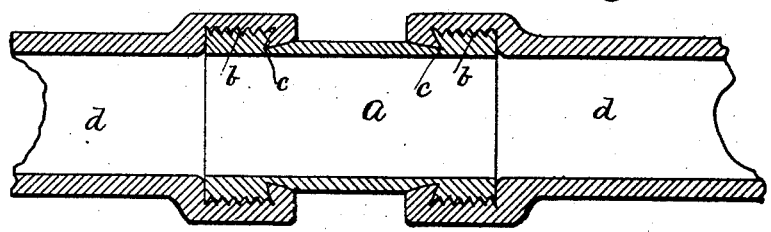
Figure 4:
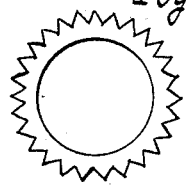
Figure 2:
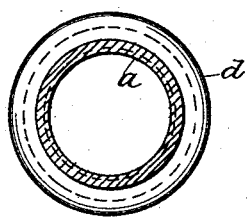
Figure 3:
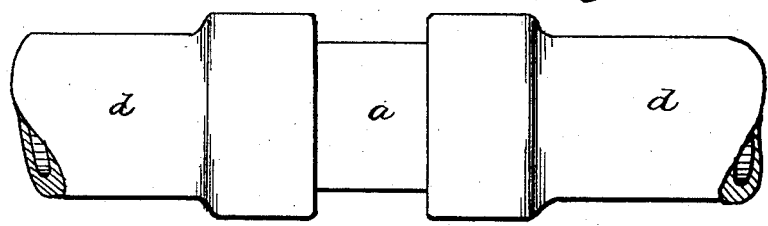

In the accompanying drawings, Figure 1 is a sectional elevation of my improved connection. Fig. 2 is an end view of the same. Fig. 3 is an outside elevation showing two pipes connected together. Fig. 4 is an end view of a modification of my invention.

To put my invention into practice and give the same bodily form, I provide a short section of pipe, $a$, which I prefer to make of brass or galvanized metal. At each end of this pipe $a$, I form a screw-thread, $b$, constituting a right and left hand screw. At the rear of each screw $b$, I diminish the diameter of the pipe $a$, in order to form an under-cut, $c$, into which the ends of the lead pipes $d$ are easily pressed.

To connect two lead pipes $d$ with a device such as described, I first form a right-hand screw-thread in the end of one of the pipes $d$, and a left-hand thread in the end of the other by means of "taps," such as are now in common use. I now connect the two pipes $d$ by screwing the section $a$ into the same until the ends overlap the threads $b$ of the section $a$. By means of a small hammer or suitable clamping device the projecting or overlapping ends of the pipes $d$ are forced into the undercut $c$, which completes the coupling.

In Fig. 4 I have represented an end view of a pipe having serrations surrounding it, which reduces the metal and facilitates the upsetting or compressing of the end of the pipe into the annular undercut groove $c$ in the rigid metal screw-threaded coupling $a$.

With this coupling lead pipes $d$ may be easily connected together without the use of solder, saving time, and thereby materially reducing the cost of joining the same together.

I am aware that it is not new in hose-couplings to provide the "tail-piece" with an annular groove having pressed into it an annular lip formed on an internally-screw-threaded coupling-ring in such manner that the said two parts are free to swivel circularly on each other, and therefore I disclaim such a device.

Having thus described my invention, what I claim, and desire to secure by Letters Patent, is—

1. A coupling for lead pipes, consisting of a rigid section having screw-threads on its ends terminated by angular undercut grooves $c$, in combination with the lead pipes screwed on said threaded ends, and having their ends forcibly pressed into said undercut grooves, thereby uniting the parts rigidly together, substantially as described.

2. The within-described coupling, consisting of the lead-pipe sections $d$ $d$, having their ends internally screw-threaded and serrated, in combination with the rigid section having its ends externally screw-threaded and provided with undercut annular grooves having the serrated ends of the said lead pipe sections upset and compressed into them, the pipe-sections also being held together by the screws, substantially as and for the purposes described.

JACKSON HEBER.

Witnesses:
W. C. BARR,
M. E. HARRISON.